(12) United States Patent
Meguriya et al.

(10) Patent No.: US 6,713,205 B2
(45) Date of Patent: Mar. 30, 2004

(54) SEALING MATERIAL FOR SOLID POLYMER FUEL CELL SEPARATOR

(75) Inventors: Noriyuki Meguriya, Takasaki (JP); Yujiro Taira, Gunma-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 17 days.

(21) Appl. No.: 10/122,388

(22) Filed: Apr. 16, 2002

(65) Prior Publication Data

US 2003/0032753 A1 Feb. 13, 2003

(30) Foreign Application Priority Data

Apr. 17, 2001 (JP) .......................... 2001-118818

(51) Int. Cl.$^7$ ................................ H01M 2/08
(52) U.S. Cl. ...................... 429/35; 528/31; 528/32; 528/15; 524/492; 524/588; 428/405
(58) Field of Search .............. 429/35; 528/31, 528/32, 15; 524/492, 588; 428/405

(56) References Cited

U.S. PATENT DOCUMENTS

| | | | |
|---|---|---|---|
| 4,585,830 A | * 4/1986 | Sweet | 524/862 |
| 5,013,772 A | 5/1991 | Fujiki et al. | |
| 6,153,326 A | 11/2000 | Matsukawa et al. | |
| 2002/0192528 A1 | * 12/2002 | Sixt et al. | 429/35 |
| 2003/0072988 A1 | * 4/2003 | Frisch et al. | 429/36 |

FOREIGN PATENT DOCUMENTS

| | | |
|---|---|---|
| EP | 0 798 342 | 10/1997 |
| JP | 2000-920 | 1/2000 |
| JP | 2000-33630 | 2/2000 |
| JP | 2000-48832 | 2/2000 |
| JP | 2000-62086 | 2/2000 |
| JP | 2000-77084 | 3/2000 |
| JP | 2000-133290 | 5/2000 |
| JP | 2000-156215 | 6/2000 |
| JP | 2000-176962 | 6/2000 |
| JP | 2000-188118 | 7/2000 |
| JP | 2000-231927 | 8/2000 |
| JP | 2001-199002 | 7/2001 |
| JP | 2001-216979 | 8/2001 |

* cited by examiner

*Primary Examiner*—Robert Dawson
*Assistant Examiner*—Marc S Zimmer
(74) *Attorney, Agent, or Firm*—Oblon, Spivak, McClelland, Maier & Neustadt, P.C.

(57) ABSTRACT

A sealing material for sealing the edges on at least one side of a solid polymer fuel cell separator is provided. This sealing material includes (A) an organopolysiloxane with at least two alkenyl groups bonded to silicon atoms within each molecule, (B) an organohydrogenpolysiloxane with at least two hydrogen atoms bonded to silicon atoms within each molecule, (C) a fumed silica with a specific surface area of 50 to 250 m$^2$/g which has undergone surface treatment with at least two different surface treatment agents, and (D) an addition reaction catalyst. This sealing material displays excellent moldability, heat resistance and elasticity, has a compression set within air and within an acidic aqueous solution which can be suppressed to a low value, and produces an excellent seal, particularly in an acidic aqueous solution.

20 Claims, No Drawings

SEALING MATERIAL FOR SOLID POLYMER FUEL CELL SEPARATOR

BACKGROUND OF THE INVENTION

1. Field of the Invention

The present invention relates to a separator of a solid polymer type fuel cell (or a solid polymer electrolyte fuel cell) used as a small scale fuel cell, and relates particularly to a sealing material for such a separator which can be used for extended periods and also offers superior moldability.

2. Description of the Prior Art

Fuel cells display many excellent properties, including being almost entirely free of natural resource depleting fossil fuels, generating very little noise during power generation, and displaying superior energy recovery rates when compared with other power generation sources. Consequently, the development of such fuel cells for comparatively small power generation plants for buildings or factories is being actively pursued, and in some cases this technology is already in use. Amongst fuel cells, solid polymer fuel cells operate at a lower temperature than other fuel cells and are consequently less likely to suffer corrosion on the surface of the component materials which make up the cell, and moreover are also capable of comparatively large current discharge considering their low operating temperature, and as such are attracting considerable attention, not only for household cogeneration, but also as potential energy sources to replace internal combustion engines in vehicles.

Amongst the components required to construct such a solid polymer fuel cell, a separator typically comprises a flat plate with a plurality of parallel channels formed in either both sides or one side of the plate, and this separator performs the function of transmitting the electricity generated at a gas diffusion electrode inside the fuel cell to an external point, as well as the function of draining water generated within the channels during the power generation process. Furthermore, the channels formed in the separator also act as fluid passages for the reactant gas flowing into the fuel cell. With the ongoing reductions in the size of fuel cells, a plurality of these type of fuel cell separators may be layered together, and in such cases, in order to seal the edges of the plurality of separators, a separator sealing material which displays excellent durability and can withstand prolonged use is required.

Packing materials formed from various types of resin are being investigated as potential separator sealing materials, although silicone rubber sealing materials, which offer superior properties of moldability, heat resistance and elasticity, are the most widely used. Amongst such silicone rubbers, addition curing type silicone resins are typically used due to their superior moldability, although they are somewhat unsatisfactory in terms of maintaining elasticity over prolonged periods. Particularly in the case of fuel cell separator packing materials, attempts have been made to ensure the maintenance of a good seal within an acidic aqueous solution by suppressing the compression set to a low value, but suppressing the compression set has proved difficult.

SUMMARY OF THE INVENTION

The present invention takes the above factors in consideration, with an object of providing a sealing material for a solid polymer fuel cell separator which displays excellent moldability, heat resistance and elasticity, has a compression set within air and within an acidic aqueous solution which can be suppressed to a low value, and produces an excellent seal, particularly in an acidic aqueous solution.

As a result of intensive research aimed at resolving the issues described above, the inventors of the present invention discovered that the above problems could be resolved by using a type of material described below, and were hence able to complete the present invention.

In other words, the present invention is a material for sealing the edges on at least one side of a solid polymer fuel cell separator, comprising (A) 100 parts by weight of an organopolysiloxane with at least two alkenyl groups bonded to silicon atoms within each molecule, (B) 0.1 to 30 parts by weight of an organohydrogenpolysiloxane with at least two hydrogen atoms bonded to silicon atoms within each molecule, (C) 10 to 50 parts by weight of a fumed silica with a specific surface area of 50 to 250 m$^2$/g which has undergone surface treatment with at least two different surface treatment agents, and (D) an effective quantity of an addition reaction catalyst.

DETAILED DESCRIPTION OF THE PREFERRED EMBODIMENTS

As follows is a more detailed description of the present invention.

A sealing material for a solid polymer fuel cell separator of the present invention incorporates the constituents (A) through (D), and each of these constituents is described in detail below.

[Constituent (A)]

In the present invention, the constituent (A) is an organopolysiloxane with at least two alkenyl groups bonded to silicon atoms within each molecule, and should preferably have a structure represented by an average composition formula (1) shown below.

$$R^1{}_a SiO_{(4-a)/2} \tag{1}$$

wherein, $R^1$ represents identical or different unsubstituted or substituted monovalent hydrocarbon groups of 1 to 10, and preferably 1 to 8 carbon atoms, and a represents a positive number of 1.5 to 2.8, and preferably 1.8 to 2.5, and even more preferably 1.95 to 2.05.

Suitable examples of the monovalent hydrocarbon groups represented by the aforementioned $R^1$ group include alkyl groups such as methyl groups, ethyl groups, propyl groups, isopropyl groups, butyl groups, isobutyl groups, tert-butyl groups, pentyl groups, neopentyl groups, hexyl groups, cyclohexyl groups, octyl groups, nonyl groups and decyl groups; aryl groups such as phenyl groups, tolyl groups, xylyl groups and naphthyl groups; aralkyl groups such as benzyl groups, phenylethyl groups and phenylpropyl groups; alkenyl groups such as vinyl groups, allyl groups, propenyl groups, isopropenyl groups, butenyl groups, hexenyl groups, cyclohexenyl groups, and octenyl groups; as well as groups in which either a portion of, or all of the hydrogen atoms in the above groups have been substituted with either a halogen atom such as fluorine, bromine or chlorine, or a cyano group, such as chloromethyl groups, chloropropyl groups, bromoethyl groups, trifluoropropyl groups and cyanoethyl groups. However, at least two of the $R^1$ groups must be alkenyl groups (preferably of 2 to 8 carbon atoms, and even more preferably of 2 to 6 carbon atoms), and examples of such alkenyl groups include those described above.

Within the $R^1$ groups of the constituent (A), the molar ratio of alkenyl groups bonded to silicon atoms relative to other non-alkenyl unsubstituted or substituted monovalent hydrocarbon groups bonded to silicon atoms, in other words, alkenyl groups/non-alkenyl unsubstituted or substituted monovalent hydrocarbon groups
should preferably be a ratio from 0.0001 to 0.02. If the molar ratio of alkenyl groups relative to other hydrocarbon groups is less than 0.0001, then the rubber hardness is insufficient and a satisfactory seal cannot be achieved, whereas at molar ratios exceeding 0.02, the cross linking density becomes too high, and the rubber becomes brittle. These alkenyl groups may be bonded to the silicon atoms at the terminals of the molecular chain, or bonded as pendent groups to non-terminal silicon atoms within the molecular chain, or alternatively bonded to both types of silicon atoms. The structure of the organopolysiloxane should be essentially a straight chain structure, although structures with partial branching or cyclic structures may also be used. There are no particular restrictions on the molecular weight, and materials from low viscosity liquid form materials through to high viscosity gums may be used, although in order to ensure a rubber like elastic body on curing, a viscosity at 25° C. of at least 100 mPa.s is required, with typical values being from 100 to 1,000,000 mPa.s, and values of 500 to 100,000 mPa.s being particularly desirable.

[Constituent (B)]

In the present invention, an organohydrogenpolysiloxane of the constituent (B) functions as a curing agent (in other words, a cross linking agent) for curing a composition of the present invention, with the silicon atom bonded hydrogen atoms (SiH groups) within the molecule undergoing a hydrosilylation addition reaction with the silicon atom bonded alkenyl groups within the constituent (A), and should preferably have a structure represented by an average composition formula (2) shown below.

$$R^2_e H_f SiO_{(4-e-f)/2} \tag{2}$$

wherein, $R^2$ represents identical or different unsubstituted or substituted monovalent hydrocarbon groups of 1 to 10 carbon atoms. Furthermore, e and f represent positive numbers which satisfy requirements that e is from 0.7 to 2.1, f is from 0.001 to 1.0, and e+f is from 0.8 to 3.0.

The organohydrogenpolysiloxane of the constituent (B) must have at least two, and preferably three or more, hydrogen atoms bonded to silicon atoms (in other words, SiH groups) within each molecule, with 2 to 200 of such groups being preferred, and 3 to 100 groups being even more desirable. There are no particular restrictions on the molecular structure of the organohydrogenpolysiloxane of the constituent (B), and straight chain, cyclic, branched, or three dimensional network type structures can be used. Furthermore, the number of silicon atoms (or the degree of polymerization) is typically within a range from 2 to 200, with values of 4 to 100 being preferred.

Specific examples of this type of organohydrogenpolysiloxane include methylhydrogenpolysiloxane with both terminals blocked with trimethylsiloxy groups, dimethylsiloxane/methylhydrogensiloxane copolymers with both terminals blocked with trimethylsiloxy groups, dimethylpolysiloxane with both terminals blocked with dimethylhydrogensiloxy groups, dimethylsiloxane/methylhydrogensiloxane copolymers with both terminals blocked with dimethylhydrogensiloxy groups, methylhydrogensiloxane/diphenylsiloxane copolymers with both terminals blocked with trimethylsiloxy groups, methylhydrogensiloxane/diphenylsiloxane/dimethylsiloxane copolymers with both terminals blocked with trimethylsiloxy groups, copolymers formed from $(CH_3)_2HSiO_{1/2}$ units and $SiO_{4/2}$ units, copolymers formed from $(CH_3)_2HSiO_{1/2}$ units, $SiO_{4/2}$ units and $(C_6H_5)SiO_{3/2}$ units, and copolymers formed of $(CH_3)_2HSiO_{1/2}$ units, $(CH_3)_3SiO_{1/2}$ units and $SiO_{4/2}$ units.

The molar ratio of Si—H groups within the constituent (B) relative to alkenyl groups bonded to silicon atoms within the constituent (A), in other words, Si—H groups/alkenyl groups should preferably be a ratio from 0.8 to 3.0, with ratios from 1.0 to 3.0 being particularly preferred. If this molar ratio is less than 0.8 or greater than 3.0, then the compression set increases and the seal produced becomes unsatisfactory. Furthermore, the amount of the constituent (B) incorporated in a composition of the present invention should be from 0.1 to 30 parts by weight per 100 parts by weight of the constituent (A), with amounts from 0.2 to 20 parts by weight being preferred.

[Constituent (C)]

The constituent (C) of the present invention, which comprises a fumed silica which has undergone surface treatment with at least two different surface treatment agents, is an essential constituent for providing the silicone rubber with sufficient strength, and not overly reducing the compression set, particularly in acidic aqueous solutions.

Examples of suitable surface treatment agents include any of the common materials such as silane coupling agents, titanate based treatment agents and fatty acid esters, although surface treatment agents selected from the materials (a) to (d) described below are preferred.

(a): Siloxane Oligomers

Suitable examples of these materials include straight chain organosiloxane oligomers with both terminals blocked with trimethylsiloxy groups, straight chain siloxane oligomers with both terminals blocked with silanol groups or alkoxy groups, straight chain siloxane oligomers incorporating pendent silanol groups within the molecular chain, and oily or resin type siloxane oligomers with branched structures formed from $RSiO_{3/2}$ units (where R represents a monovalent hydrocarbon group such as an alkyl group or an alkenyl group) and $SiO_{4/2}$, units. In this description, a siloxane oligomer refers to a low grade polymer comprising typically 2 to 50, and preferably 2 to 20, and even more preferably 2 to 10 siloxane units.

(b): Organochlorosilanes and Partial Hydrolysis Condensates Thereof

Suitable examples of these materials include trimethylchlorosilane, dimethyldichlorosilane, vinyltrichlorosilane, diphenyldichlorosilane, methyltrichlorosilane, methylvinyldichlorosilane, vinyldimethylchlorosilane, as well as partial hydrolysis condensates of one, or two or more of such materials.

(c): Organoalkoxysilanes and Partial Hydrolysis Condensates Thereof

Suitable examples of these materials include methyltrimethoxysilane, dimethyldimethoxysilane, methyltriethoxysilane, vinyltrimethoxysilane, vinyltriethoxysilane, vinyltriacetoxysilane, allyltrimethoxysilane, phenyltrimethoxysilane, propyltrimethoxysilane, γ-methacryloxypropyltrimethoxysilane, as well as partial hydrolysis condensates of one, or two or more of such materials.

(d): Organosilazanes and Partial Hydrolysis Condensates Thereof

Suitable examples of these materials include hexamethyldisilazane, divinyltetramethyldisilazane, tetravinyldimethyldisilazane, octamethyltrisilazane, as well as partial hydrolysis condensates of one, or two or more of such materials.

There are no particular restrictions on the surface treatment method, and the untreated silica may be treated directly and simultaneously with two different surface treatment agents, or may be treated in a two step process. Furthermore, the two different surface treatment agents may be added either at the time of mixing, or following the mixing, of the silica with the silicone oil or gum of the constituent (A), with the surface treatment agents added either simultaneously or in a two step process. Alternatively, the fumed silica could be treated directly with one surface treatment agent, and the other surface treatment agent then added at the time of mixing with the silicone oil. These surface treatment agents may bond strongly through reaction with the fumed silica, or may simply undergo a physical adsorption to the silica.

The specific surface area of the fumed silica (as measured by BET methods) should be from 50 to 250 $m^2/g$, and preferably from 80 to 220 $m^2/g$, and even more preferably from 100 to 220 $m^2/g$, both prior to, and following surface treatment. At specific surface area values less than 50 $m^2/g$, insufficient rubber strength is achieved for a sealing material, whereas at values exceeding 250 $m^2/g$, the compression set increases and the quality of the seal produced deteriorates.

The amount of this type of surface treated fumed silica used should be from 10 to 50 parts by weight, and preferably 10 to 40 parts by weight, per 100 parts by weight of the constituent (A). At amounts less than 10 parts by weight insufficient rubber strength is achieved, whereas at amounts exceeding 50 parts by weight, the compression set increases and the quality of the seal produced deteriorates.

[Constituent (D)]

Suitable examples of the addition reaction catalyst of the constituent (D) include platinum black, platinum (II) chloride, chloroplatinic acid, reaction products of chloroplatinic acid and monohydric alcohols, complexes of chloroplatinic acid and olefins, platinum bisacetoacetate, as well as palladium based catalysts and rhodium based catalysts. This addition reaction catalyst is used in quantities which offer effective catalytic action. Specifically, weight referenced quantities of 0.1 to 1,000 ppm, and preferably 0.5 to 500 ppm, more preferably 1 to 200 ppm, are used relative to the combined weight of the constituent (A) and the constituent (B).

[Other Constituents]

Where necessary, other additives may also be included in a composition of the present invention, including fillers such as fine silica powders and calcium carbonate, reinforcing agents such as silicone based resins and organopolysiloxane resins with a three-dimensional network structure formed of $R^1SiO_{3/2}$ units and/or $SiO_{4/2}$ units, and optionally $R^1{}_3SiO_{1/2}$ units and $R^1{}_2SiO_{2/2}$ units where, in the formulas representing the units, $R^1$ each are as defined above, and conductive agents such as carbon black conductive zinc oxide and metallic powders, hydrosilylation reaction retarding agents such as nitrogen containing compounds and acetylene compounds, phosphorus compounds, nitrile compounds, carboxylates, tin compounds, mercury compounds and sulfur compounds, reagents for improving the heat resistance such as iron oxide and cerium oxide, internal mold releasing agents such as dimethylsilicone oil, adhesion imparting agents, and thixotropic agents.

[Sealing Material, Sealing Method]

A sealing material of the present invention may be used in a similar manner to a typical curable silicone rubber composition, where the aforementioned constituents are separated into two liquids comprising, for example, the constituent (A) and the constituent (D) in one liquid, and the constituent (B) and the constituent (C) in the other, and the two liquids are then mixed together at the time of use. Furthermore, the constituents could also be mixed together in a single liquid composition with a small amount of a curing inhibitor added, or alternatively could also be used as a cured product.

In the case in which a sealing material comprising the aforementioned constituents (A) through (D) is used in a solid polymer fuel cell separator, then at least one edge of the separator is sealed, either by applying an uncured liquid form sealing material to the required sections using dipping, coating, screen printing or insertion molding, or alternatively by molding the sealing material into an appropriately shaped cured product.

EXAMPLES

As follows is a description of specifics of the present invention using a series of examples. However, the present invention is in no way limited to the examples presented.

Example 1

68 parts by weight of a dimethylpolysiloxane (1) with both terminals blocked with dimethylvinylsiloxy groups and with a viscosity at 25° C. of 10,000 mPa.s, 32 parts by weight of a fumed silica with a specific surface area of 130 $m^2/g$ which had undergone hydrophobic surface treatment with dimethyldichlorosilane to produce a specific surface area following surface treatment of 110 $m^2/g$ (Aerosil R972, manufactured by Nippon Aerosil Co., Ltd.), 5 parts by weight of hexamethyldisilazane, and 2.0 parts by weight of water were mixed at room temperature for 30 minutes, the temperature was then raised to 150° C. and the stirring continued for a further 3 hours, and the temperature was then cooled to yield a silicone rubber base. To 100 parts by weight of this silicone rubber base was added 30 parts by weight of a dimethylpolysiloxane (2) with both terminals blocked with dimethylvinylsiloxy groups and with a viscosity at 25° C. of 1,000 mPa.s, and after stirring for 30 minutes, 1.83 parts by weight [the equivalent of a Si—H/alkenyl group ratio of 1.51] of a methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition. To this silicone rubber composition was added 0.1 parts by weight of a platinum catalyst (a Pt concentration of 1%), and following precuring for 10 minutes at 120° C., the composition was subjected to post curing in a 200° C. oven for 4 hours. The specific gravity, hardness and compression set of the thus obtained cured product were measured in accordance with JIS K 6249. The results of these measurements are shown in Table 1. The compression set was measured under two sets of conditions, namely 120° C.×500 hours in air, and 120° C.×500 hours in a 0.01 N aqueous sulfuric acid solution.

Example 2

68 parts by weight of the dimethylpolysiloxane (1) of the example 1, 20 parts by weight of a fumed silica with a specific surface area of 200 m²/g which had undergone hydrophobic surface treatment with dimethyldichlorosilane to produce a specific surface area of 180 m²/g (Rheorosil DM20S, manufactured by Tokuyama Corporation), 3 parts by weight of hexamethyldisilazane, and 2.0 parts by weight of water were mixed at room temperature for 30 minutes, the temperature was then raised to 150° C. and the stirring continued for a further 3 hours, and the temperature was then cooled to yield a silicone rubber base. To 88 parts by weight of this silicone rubber base was added 30 parts by weight of the dimethylpolysiloxane (2) of the example 1, and after stirring for 30 minutes, 2.44 parts by weight [the equivalent of a Si—H/alkenyl group ratio of 2.0] of the methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition. To this silicone rubber composition was added 0.1 parts by weight of a platinum catalyst (a Pt concentration of 1%), and the composition was then cured in the same manner as the example 1. The specific gravity, hardness and compression set of the thus obtained cured product were measured in accordance with JIS K 6249. The results of these measurements are shown in Table 1.

Example 3

68 parts by weight of the dimethylpolysiloxane (1) of the example 1, 32 parts by weight of a fumed silica with a specific surface area of 200 m²/g which had undergone hydrophobic surface treatment with a siloxane oligomer to produce a specific surface area of 140 m²/g (Rheorosil PM20, manufactured by Tokuyama Corporation), 5 parts by weight of hexamethyldisilazane, and 2.0 parts by weight of water were mixed at room temperature for 30 minutes, the temperature was then raised to 150° C. and the stirring continued for a further 3 hours, and the temperature was then cooled to yield a silicone rubber base. To 100 parts by weight of this silicone rubber base was added 30 parts by weight of the dimethylpolysiloxane (2) of the example 1, and after stirring for 30 minutes, 1.83 parts by weight [the equivalent of a Si—H/alkenyl group ratio of 1.5] of the methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition. To this silicone rubber composition was added 0.1 parts by weight of a platinum catalyst (a Pt concentration of 1%), and the composition was then cured in the same manner as the example 1. The specific gravity, hardness and compression set of the thus obtained cured product were measured in accordance with JIS K 6249. The results of these measurements are shown in Table 1.

Example 4

68 parts by weight of the dimethylpolysiloxane (1) of the example 1, 32 parts by weight of a fumed silica with a specific surface area of 200 m²/g which had undergone hydrophobic surface treatment with hexamethyldisilazane to produce a specific surface area of 160 m²/g (Rheorosil HM20S, manufactured by Tokuyama Corporation), 5 parts by weight of a siloxane oligomer (4) with silanol groups, as represented by the formula shown below,

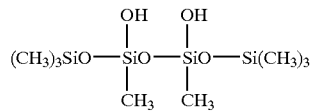

and 2.0 parts by weight of water were mixed at room temperature for 30 minutes, the temperature was then raised to 150° C. and the stirring continued for a further 3 hours, and the temperature was then cooled to yield a silicone rubber base. To 100 parts by weight of this silicone rubber base was added 30 parts by weight of the dimethylpolysiloxane (2) of the example 1, and after stirring for 30 minutes, 1.83 parts by weight [the equivalent of a Si—H/alkenyl group ratio of 1.5] of the methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition. To this silicone rubber composition was added 0.1 parts by weight of a platinum catalyst (a Pt concentration of 1%), and the composition was then cured in the same manner as the example 1. The specific gravity, hardness and compression set of the thus obtained cured product were measured in accordance with JIS K 6249. The results of these measurements are shown in Table 1.

Example 5

68 parts by weight of the dimethylpolysiloxane (1) of the example 1, 32 parts by weight of a fumed silica with a specific surface area of 130 m²/g (Aerosil 130, manufactured by Nippon Aerosil Co., Ltd.), and 5 parts by weight of a dimethylsiloxane with an average degree of polymerization of 3 and with both molecular chain terminals blocked with hydroxydimethylsiloxy groups were mixed at room temperature for 30 minutes, before 5 parts by weight of hexamethyldisilazane and 2.0 parts by weight of water were added and the resulting mixture was stirred for a further 30 minutes at room temperature. The temperature was subsequently raised to 150° C. and the stirring continued for a further 3 hours, before the temperature was cooled to yield a silicone rubber base. To 100 parts by weight of this silicone rubber base were added 20 parts by weight of the dimethylpolysiloxane (2) of the example 1, and 10 parts by weight of a dimethylpolysiloxane (5) with both terminals blocked with trimethylsiloxy groups and with vinyl groups bonded to non-terminal silicon atoms within the principal chain (and with a degree of polymerization of 200, and 0.0005 mol/g of vinyl groups), and after stirring for 30 minutes, 2.21 parts by weight [the equivalent of a Si—H/alkenyl group ratio of 1.2] of the methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition.

To this silicone rubber composition was added 0.1 parts by weight of a platinum catalyst (a Pt concentration of 1%), and the composition was then cured in the same manner as the example 1. The specific gravity, hardness and compression set of the thus obtained cured product were measured in accordance with JIS K 6249. The results of these measurements are shown in Table 1.

Example 6

60 parts by weight of the dimethylpolysiloxane (1) of the example 1, 40 parts by weight of a fumed silica with a specific surface area of 200 m$^2$/g (Aerosil 200, manufactured by Nippon Aerosil Co., Ltd.), 6 parts by weight of hexamethyldisilazane and 2.0 parts by weight of water were mixed at room temperature for 30 minutes, before 5 parts by weight of ethyltrimethoxysilane was added and the resulting mixture was stirred for a further 30 minutes at room temperature. The temperature was subsequently raised to 150° C. and the stirring continued for a further 3 hours, before the temperature was cooled to yield a silicone rubber base. To 100 parts by weight of this silicone rubber base was added 30 parts by weight of the dimethylpolysiloxane (2) of the example 1, and after stirring for 30 minutes, 2.88 parts by weight [the equivalent of a Si—H/alkenyl group ratio of 2.5] of the methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition. To this silicone rubber composition was added 0.1 parts by weight of a platinum catalyst (a Pt concentration of 1%), and the composition was then cured in the same manner as the example 1. The specific gravity, hardness and compression set of the thus obtained cured product were measured in accordance with JIS K 6249. The results of these measurements are shown in Table 1.

Comparative Example 1

68 parts by weight of the dimethylpolysiloxane (1) of the example 1, and 32 parts by weight of the hydrophobic surface treated fumed silica used in the example 1, with a specific surface area of 110 m$^2$/g (Aerosil R972), were mixed at room temperature for 30 minutes, the temperature was then raised to 150° C. and the stirring continued for a further 3 hours, and the temperature was then cooled to yield a silicone rubber base. To 100 parts by weight of this silicone rubber base was added 30 parts by weight of the dimethylpolysiloxane (2) of the example 1, and after stirring for 30 minutes, 1.83 parts by weight [the equivalent of a Si—H/alkenyl group ratio of 1.5] of the methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition. To this silicone rubber composition was added 0.1 parts by weight of a platinum catalyst (a Pt concentration of 1%), and the composition was then cured in the same manner as the example 1. The specific gravity, hardness and compression set of the thus obtained cured product were measured in accordance with JIS K 6249. The results of these measurements are shown in Table 2.

Comparative Example 2

68 parts by weight of the dimethylpolysiloxane (1) of the example 1, and 32 parts by weight of the hydrophobic surface treated fumed silica used in the example 3, with a specific surface area of 140 m$^2$/g (Rheorosil PM20), were mixed at room temperature for 30 minutes, the temperature was then raised to 150° C. and the stirring continued for a further 3 hours, and the temperature was then cooled to yield a silicone rubber base. To 100 parts by weight of this silicone rubber base was added 30 parts by weight of the dimethylpolysiloxane (2) of the example 1, and after stirring for 30 minutes, 1.83 parts by weight [the equivalent of a Si—H/alkenyl group ratio of 1.5] of the methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition. To this silicone rubber composition was added 0.1 parts by weight of a platinum catalyst (a Pt concentration of 1%), and the composition was then cured in the same manner as the example 1. The specific gravity, hardness and compression set of the thus obtained cured product were measured in accordance with JIS K 6249. The results of these measurements are shown in Table 2.

Comparative Example 3

68 parts by weight of the dimethylpolysiloxane (1) of the example 1, 32 parts by weight of the fumed silica of the example 5, with a specific surface area of 200 m$^2$/g (Aerosil 200), 3 parts by weight of hexamethyldisilazane, and 2.0 parts by weight of water were mixed at room temperature for 30 minutes, the temperature was then raised to 150° C. and the stirring continued for a further 3 hours, and the temperature was then cooled to yield a silicone rubber base. To 100 parts by weight of this silicone rubber base were added 20 parts by weight of the dimethylpolysiloxane (2) of the example 1 and 10 parts by weight of the dimethylpolysiloxane (5) of the example 5 (with a degree of polymerization of 200, and 0.0005 mol/g of vinyl groups), and after stirring for 30 minutes, 2.21 parts by weight [the equivalent of a Si—H/alkenyl group ratio of 1.2] of the methylhydrogenpolysiloxane (3) with Si—H groups at both terminals of the molecular chain and also within the molecular chain (with a degree of polymerization of 17, and 0.0060 mol/g of Si—H groups) as a cross linking agent, and 0.05 parts by weight of ethynylcyclohexanol as a reaction retarding agent were added, and the mixture was stirred for a further 15 minutes to yield a silicone rubber composition. To this silicone rubber composition was added 0.1 parts by weight of a platinum catalyst (a Pt concentration of 1%), and the composition was then cured in the same manner as the example 1. The specific gravity, hardness and compression set of the thus obtained cured product were measured in accordance with JIS K 6249. The results of these measurements are shown in Table 2.

TABLE 1

| | Example 1 | Example 2 | Example 3 | Example 4 | Example 5 | Example 6 |
|---|---|---|---|---|---|---|
| Surface treatment agent (1) | dimethyldi-chlorosilane | dimethyldi-chlorosilane | siloxane oligomer | hexamethyl disilazane | silanol containing siloxane | hexamethyl disilazane |
| Surface treatment agent (2) | hexamethyl disilazane | hexamethyl disilazane | hexamethyl disilazane | silanol containing siloxane | hexamethyl disilazane | ethyltrimeth-oxysilane |
| Specific gravity (25° C.) | 1.12 | 1.07 | 1.12 | 1.12 | 1.12 | 1.16 |
| Hardness durometer A) | 39 | 35 | 43 | 43 | 50 | 46 |
| Compression set (%) (Condition 1) | 10.4 | 8.5 | 12.2 | 11.5 | 11.6 | 12.9 |
| Compression set (%) (Condition 2) | 20.8 | 19.7 | 23.5 | 21.6 | 22.1 | 24.6 |

TABLE 2

| | Comparative Example 1 | Comparative Example 2 | Comparative Example 3 |
|---|---|---|---|
| Surface treatment agent (1) | dimethyldi-chlorosilane | siloxane oligomer | hexamethyl disilazane |
| Specific gravity (25° C.) | 1.12 | 1.12 | 1.12 |
| Hardness (durometer A) | 42 | 45 | 53 |
| Compression set (%) (Condition 1) | 14.2 | 16.7 | 14.6 |
| Compression set (%) (Condition 2) | 31.2 | 38.2 | 40.5 |

(Condition 1): 120° C.×500 hours in air
(Condition 2): 120° C.×500 hours in 0.01 N aqueous sulfuric acid solution As is evident from the above results, a sealing material for a solid polymer fuel cell separator according to the present invention displays excellent moldability, heat resistance and elasticity, has a compression set within air and within an acidic aqueous solution which can be suppressed to a low value, and produces an excellent seal, particularly in an acidic aqueous solution.

What is claimed is:

1. A solid polymer fuel cell comprising a separator, said separator comprising a sealing material for sealing edges on at least one side of said separator, said sealing material comprising
   (A) 100 parts by weight of an organopolysiloxane with at least two alkenyl groups bonded to silicon atoms within each molecule,
   (B) 0.1 to 30 parts by weight of an organohydrogenpolysiloxane with at least two hydrogen atoms bonded to silicon atoms within each molecule,
   (C) 10 to 50 parts by weight of a fumed silica with a specific surface area of 50 to 250 m²/g (as measured by a BET method) which has undergone surface treatment with at least two different surface treatment agents, and
   (D) an effective quantity of an addition reaction catalyst.

2. The solid polymer fuel cell according to claim 1, wherein said organopolysiloxane of said constituent (A) of said sealing material is represented by an average composition formula (1):

$$R^1{}_a SiO_{(4-a)/2} \tag{1}$$

wherein, $R_1$ represents either one of identical and different unsubstituted and substituted monovalent hydrocarbon groups of 1 to 10 carbon atoms, and a represents a positive number of 1.5 to 2.8.

3. The solid polymer fuel cell according to claim 2, wherein each $R_1$ represents, independently, any one of an alkyl group, an aryl group, an aralkyl group, an alkenyl group, and a substituted hydrocarbon group thereof in which at least a portion of hydrogen atoms within said group are substituted with either one of a halogen atom and a cyano group.

4. The solid polymer fuel cell for a separator according to claim 1, wherein within said constituent (A) of said sealing material, a molar ratio of alkenyl groups bonded to silicon atoms relative to other non-alkenyl unsubstituted or substituted monovalent hydrocarbon groups bonded to silicon atoms, (alkenyl groups/non-alkenyl unsubstituted or substituted monovalent hydrocarbon groups) is a ratio from 0.0001 to 0.02.

5. The solid polymer fuel cell according to claim 1, wherein said organohydrogenpolysiloxane of said constituent (B) of said sealing material is represented by an average composition formula (2):

$$R^2{}_e H_f SiO_{(4-e-f)/2} \tag{2}$$

wherein, $R_2$ represents either one of identical and different unsubstituted and substituted monovalent hydrocarbon groups of 1 to 10 carbon atoms, and e and f represent positive numbers which satisfy requirements that e is from 0.7 to 2.1, f is from 0.001 to 1.0, and e+f is from 0.8 to 3.0.

6. The solid polymer fuel cell according to claim 1, wherein said organohydrogenpolysiloxane of said constituent (B) of said sealing material has at least three silicon atom bonded hydrogen atoms within each molecule.

7. The solid polymer fuel cell according to claim 1, wherein in said sealing material a molar ratio of Si—H groups within said constituent (B) relative to alkenyl groups bonded to silicon atoms within said constituent (A) (Si—H groups/alkenyl groups) is from 0.8 to 3.0.

8. The solid polymer fuel cell according to claim 7, wherein said molar ratio of Si—H groups/alkenyl groups is from 1.0 to 3.0.

9. The solid polymer fuel cell according to claim 1, wherein in said sealing material said at least two different surface treatment agents used on said constituent (C) are selected from the group consisting of
   (a) siloxane oligomers,
   (b) organochlorosilanes and partial hydrolysis condensates thereof,
   (c) organoalkoxysilanes and partial hydrolysis condensates thereof, and
   (d) organosilazanes and partial hydrolysis condensates thereof.

10. The solid polymer fuel cell according to claim 1, said sealing material further comprising any one of a filler, a reinforcing agent, a conductive agent, a hydrosilylation reaction retarding agent, a heat resistance imparting agent, an internal mold releasing agent, an adhesion imparting agent, a thixotropic agent, and a combination of two or more of said agents.

11. The solid polymer fuel cell according to claim 1, wherein said surface treatment is effected simultaneously with said at least two different surface treatment agents.

12. The solid polymer fuel cell according to claim 1, wherein said surface treatment is effected in a two step process.

13. The solid polymer fuel cell according to claim 1, wherein the specific surface area of said fumed silica is 80 to 220 $m^2/g$.

14. The solid polymer fuel cell according to claim 1, wherein the specific surface area of said fumed silica is 100 to 220 $m^2/g$.

15. The solid polymer fuel cell according to claim 1, wherein the amount of fumed silica is 10 to 40 parts by weight.

16. The solid polymer fuel cell according to claim 1, wherein the addition reaction catalyst (D) is platinum black, platinum (II) chloride, chloroplatinic acid, reaction products of chloroplatinic acid and monohydric alcohols, complexes of chloroplatinic acid and olefins, platinum bisacetoacetate, a palladium based catalyst or a rhodium based catalyst.

17. The solid polymer fuel cell according to claim 16, wherein (D) is present in an amount of 0.1 to 1,000 ppm relative to the combined weight of constituent (A) and constituent (B).

18. The solid polymer fuel cell according to claim 16, wherein (D) is present in an amount of 0.5 to 500 ppm relative to the combined weight of constituent (A) and constituent (B).

19. The solid polymer fuel cell according to claim 16, wherein (D) is present in an amount of 1 to 200 ppm relative to the combined weight of constituent (A) and constituent (B).

20. A solid polymer fuel cell separator, sealed at edges on at least one side of said separator with a sealing material, said sealing material comprising
   (A) 100 parts by weight of an organopolysiloxane with at least two alkenyl groups bonded to silicon atoms within each molecule,
   (B) 0.1 to 30 parts by weight of an organobydrogenpolysiloxane with at least two hydrogen atoms bonded to silicon atoms within each molecule,
   (C) 10 to 50 parts by weight of a fumed silica with a specific surface area of 50 to 250 $m^2/g$ (as measured by a BET method) which has undergone surface treatment with at least two different surface treatment agents, and
   (D) an effective quantity of an addition reaction catalyst.

* * * * *